United States Patent
Reichler et al.

(10) Patent No.: US 9,694,378 B2
(45) Date of Patent: Jul. 4, 2017

(54) APPLICATION ROBOT HAVING A CONNECTION UNIT FOR DIFFERENT APPLICATORS

(71) Applicant: Eisenmann SE, Boeblingen (DE)

(72) Inventors: Jan Reichler, Constance (DE); Ralph Meier, Waldenbuch (DE); Jannis Tomaschko, Holzgerlingen (DE)

(73) Assignee: EISENMANN SE, Boeblingen (DE)

( * ) Notice: Subject to any disclaimer, the term of this patent is extended or adjusted under 35 U.S.C. 154(b) by 12 days.

(21) Appl. No.: 14/442,774

(22) PCT Filed: Oct. 25, 2013

(86) PCT No.: PCT/EP2013/003216
§ 371 (c)(1),
(2) Date: May 14, 2015

(87) PCT Pub. No.: WO2014/075762
PCT Pub. Date: Mar. 22, 2014

(65) Prior Publication Data
US 2015/0328655 A1    Nov. 19, 2015

(30) Foreign Application Priority Data
Nov. 16, 2012  (DE) .................... 10 2012 022 535

(51) Int. Cl.
*B05B 13/04* (2006.01)
*B05B 13/02* (2006.01)
(Continued)

(52) U.S. Cl.
CPC ...... *B05B 13/0431* (2013.01); *B05B 12/1454* (2013.01); *B05B 12/1472* (2013.01);
(Continued)

(58) Field of Classification Search
None
See application file for complete search history.

(56) References Cited

U.S. PATENT DOCUMENTS 4,697,741 A     10/1987  Dengler et al.
4,875,275 A  *  10/1989  Hutchinson .............. B25J 15/04
                                                    279/93

(Continued)

FOREIGN PATENT DOCUMENTS

DE           33 37 980 C1      5/1985
DE          199 14 040 A1     10/2000
(Continued)

*Primary Examiner* — Binu Thomas
(74) *Attorney, Agent, or Firm* — Factor Intellectual Property Law Group, Ltd.

(57) ABSTRACT

The invention relates to an applicator connection unit for an application robot for coating objects having supply lines for an applicator. An applicator can be fastened on the applicator connection unit in such a way that working lines of the applicator are connected to the supply lines of the applicator connection unit. The applicator connection unit is formed as an adapter unit in such a way that at least one applicator of a first mode of operation and one applicator of a second mode of operation can be releasably and replaceably fastened to the applicator connection unit. The invention further relates to an application robot and a system for coating objects, wherein such an applicator connection unit is used.

12 Claims, 5 Drawing Sheets

(51) Int. Cl.
*B05B 15/06* (2006.01)
*F16L 37/248* (2006.01)
*B25J 15/00* (2006.01)
*B25J 15/04* (2006.01)
*B05B 12/14* (2006.01)
*F16L 39/00* (2006.01)

(52) U.S. Cl.
CPC ........ *B05B 13/0221* (2013.01); *B05B 15/065* (2013.01); *F16L 37/248* (2013.01); *B05B 12/1409* (2013.01); *B25J 15/0019* (2013.01); *B25J 15/04* (2013.01); *F16L 39/00* (2013.01)

(56) References Cited

U.S. PATENT DOCUMENTS

| | | | |
|---|---|---|---|
| 4,944,459 A * | 7/1990 | Watanabe | B05B 12/1472 239/305 |
| 6,010,084 A * | 1/2000 | Yoshida | B05B 3/1064 239/112 |
| 6,073,512 A * | 6/2000 | McCormick | G05G 1/04 74/527 |
| 6,712,285 B2 | 3/2004 | Provenaz et al. | |
| 2002/0043567 A1 | 4/2002 | Provenaz et al. | |
| 2004/0129208 A1* | 7/2004 | Nolte | B05B 12/1454 118/305 |
| 2004/0192524 A1* | 9/2004 | Nolte | B25J 15/0491 483/59 |
| 2010/0116914 A1* | 5/2010 | Griesenbruch | B05B 15/065 239/602 |
| 2010/0307279 A1* | 12/2010 | Campagna | B25J 15/04 901/28 |

FOREIGN PATENT DOCUMENTS

| | | |
|---|---|---|
| DE | 10 2005 036 342 A1 | 3/2006 |
| DE | 601 25 369 T2 | 10/2007 |
| EP | 0 850 693 A1 | 7/1998 |
| EP | 1 129 784 A2 | 9/2001 |
| EP | 1 245 296 A1 | 10/2002 |
| WO | 97/24189 A1 | 7/1997 |

* cited by examiner

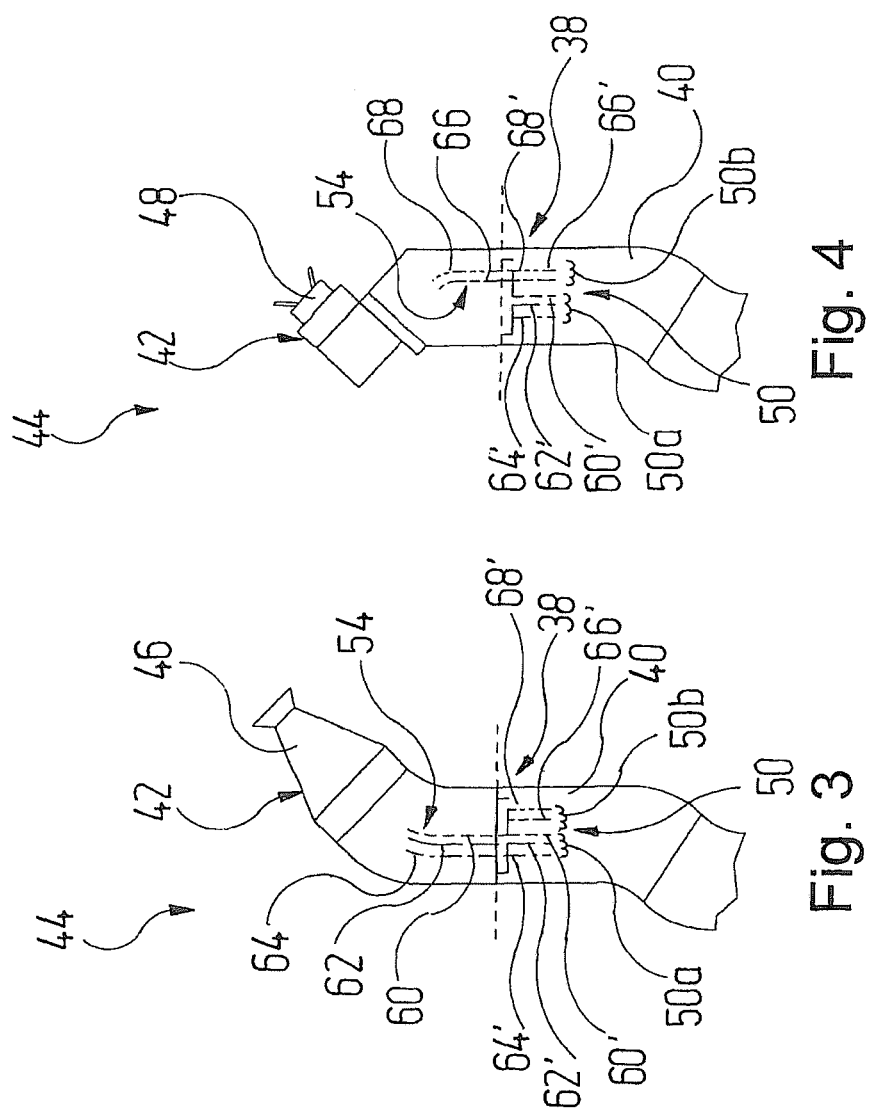

APPLICATION ROBOT HAVING A CONNECTION UNIT FOR DIFFERENT APPLICATORS

RELATED APPLICATIONS

This application is a national phase of International Patent Application No. PCT/EP2013/003216, filed Oct. 25, 2013, which claims the filing benefit of German Patent Application No. 10 2012 022 535.0, filed Nov. 16, 2012, the contents of both of which are incorporated herein by reference.

FIELD OF THE INVENTION

The invention relates to an applicator connection unit for an application robot for coating objects, which comprises supply lines for an applicator and to which an applicator can be fastened in such a way that working lines of the applicator are connected to the supply lines of the applicator connection unit.

The invention moreover relates to an application robot for coating objects, which has a robot arm and an applicator connection unit for an applicator, which applicator connection unit is carried by the robot arm, and an installation for coating objects which has a coating chamber in which at least one such application robot is arranged.

BACKGROUND OF THE INVENTION

Application robots of this type are used in particular in paint installations for painting vehicle bodies, but also for coating other objects. For example, adhesives, cleaning fluids or other cleaning media or protective coatings can be applied to objects by means of such application robots.

Application robots of this type are usually multiaxial, carry an application unit with them and can accurately follow the contour of an object to be coated due to their multiaxiality. In the case of known application robots, an application unit comprises an applicator connection unit and the actual applicator.

The applicator connection unit here has a connection flange to which an applicator is screwed, with the working lines of the applicator being connected there to the additionally functionally complementary supply lines of the applicator connection unit. The supply lines of the applicator connection unit and the working lines of the applicator can be fluid-conducting lines, for example for paint or compressed air, on the one hand or, for example, electrical lines on the other. In general terms, the applicator can be supplied with all working media required for its operation by way of the supply lines of the applicator connection unit.

Known applicator connection units are adapted to a particular applicator with a particular operating mode and comprise all the supply lines required for this. In the event of a fault or failure of an applicator, this can be released manually from the connection flange by an operator and replaced with an applicator with the same operating mode, which matches the existing supply lines in the applicator connection unit.

However, there are various types of applicator which are operated in different operating modes. Classic applicators with different operating modes which are used for painting objects are, for example, electrostatically operating high-speed rotary atomisers and pneumatically operated spray guns. Applicators which are used for cleaning the objects or components of the coating chamber can also be referred to as spray guns in that they are used to deliver cleaning media.

Depending on the objects to be coated or the desired coating outcome, which also includes the cleaning outcome, it may be that a plurality of applicators with different operating modes are intended or have to be used in the course of one coating process.

If an applicator with a first operating mode is now to be changed for an applicator with a second operating mode, known application units have to therefore be replaced as an assembly. It may even be necessary to implement further measures on the application robot in order to adapt its lines leading to the applicator connection unit to another application unit which operates in a different manner and has a differently operating applicator.

However, such modifications are very complex and time-consuming and consequently lead to undesired downtimes for a coating installation. An object of the present invention is to address such disadvantages.

SUMMARY OF THE INVENTION

This object may be achieved for an applicator connection unit of the type described at the outset in that, the applicator connection unit is constructed as an adapter unit in such a way that at least one applicator of a first operating mode and an applicator of a second operating mode can be releasably and replaceably fastened to the applicator connection unit.

The replacement of the applicator of the first operating mode with the applicator of the second operating mode can thereby preferably be carried out in automated manner. This means that it is possible to change an applicator without an operator having to intervene manually for this. This calls for at least one coupling device which can be operated in correspondingly automated manner. Since the applicator connection unit can then remain on the application robot and it is possible to replace just the applicator, the changeover of the applicator can be carried out altogether more quickly and easily than is possible for known application units.

It is essentially possible for the supply lines of the applicator connection unit to only be designed for a single operating mode of an applicator. For an applicator of a second operating mode, the applicator connection unit can then serve as a support and guide device if the necessary operating media can be supplied to this applicator externally. This becomes clear from the description below.

However, it is particularly favourable if
a) the supply lines comprises a first supply group having supply lines for the applicator of the first operating mode and at least one second supply group having supply lines for the applicator of the second operating mode;
b) the applicator connection unit comprises a connecting device by means of which supply lines of the applicator connection unit can be optionally blocked or functionally connected to working lines of an applicator.

It is clear that the applicator connection unit in this case has to also be connected to corresponding supply sources, be these fluid sources or energy sources, for which corresponding supply lines also have to be present in the robot arm and the other components of the application robot. However, an applicator connection unit of this type enables the option of changing between two applicators of different operating modes quickly and effectively.

Reliable connection of an applicator to the applicator connection unit can be achieved without complex control means if the connecting device comprises an adapter member with connecting lines, which can assume at least two connecting positions and thereby, in a first connecting position, connects connecting lines of a first connecting group to the supply lines of the first supply group and, in a second connecting position, connects connecting lines of a second connecting group to the supply lines of the second connecting group and moreover, in a changeover position, closes all supply groups of the applicator connection unit.

The adapter member is advantageously constructed as a rotatably mounted rotary plate which defines a connection output side of the applicator connection unit.

As far as the fastening of different applicators to the applicator connection unit is again concerned, it is favourable if a coupling device is present which is of a complementary construction to fastening means on the applicators.

This can be achieved for example in that the coupling device is constructed as a plug-in/turning part of a bayonet closure. The part of the bayonet closure which complements this is then present on the different applicators which are intended to cooperate with the applicator connection unit.

The fastening of the applicator to the applicator connection unit and the connection of the necessary lines can be advantageously linked if the adapter member comprises the coupling device.

With regard to the application robot of the type mentioned at the outset, the object indicated above may be achieved with the same advantages in that the applicator connection unit has some or all of the above-mentioned features.

The statement above also applies accordingly to the installation of the type mentioned at the outset if its application robots are equipped with an applicator connection unit of this type.

With regard to the installation, it is moreover advantageous if, arranged in the coating chamber, there is at least one changeover station by means of which at least one applicator of a first operating mode and at least one applicator or a second operating mode can be held available. Therefore, in the event of a necessary changeover, it is possible to access the required applicator located in the changeover station in automated manner.

It can be favourable if the changeover station is constructed as a changeover lock and comprises a lock element which separates the coating chamber from an operating zone arranged outside the coating chamber.

In particular, when a replaced applicator is to undergo maintenance or be exchanged for another applicator which is to be held available, this is favourable since the necessary measure can be implemented without an operator having to enter the usually charged atmosphere of the treatment chamber.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the drawings, which show:

FIG. 3 a schematic view of a hand portion of one of the paint robots in a partial phantom view, which carries an applicator with a first operating mode in the form of a high-speed rotary atomiser;

FIG. 4 a schematic view of a hand portion of the paint robot in a partial phantom view, which carries an applicator with a second operating mode in the form of a spray gun;

DETAILED DESCRIPTION OF THE PRESENT INVENTION

Figure 1:
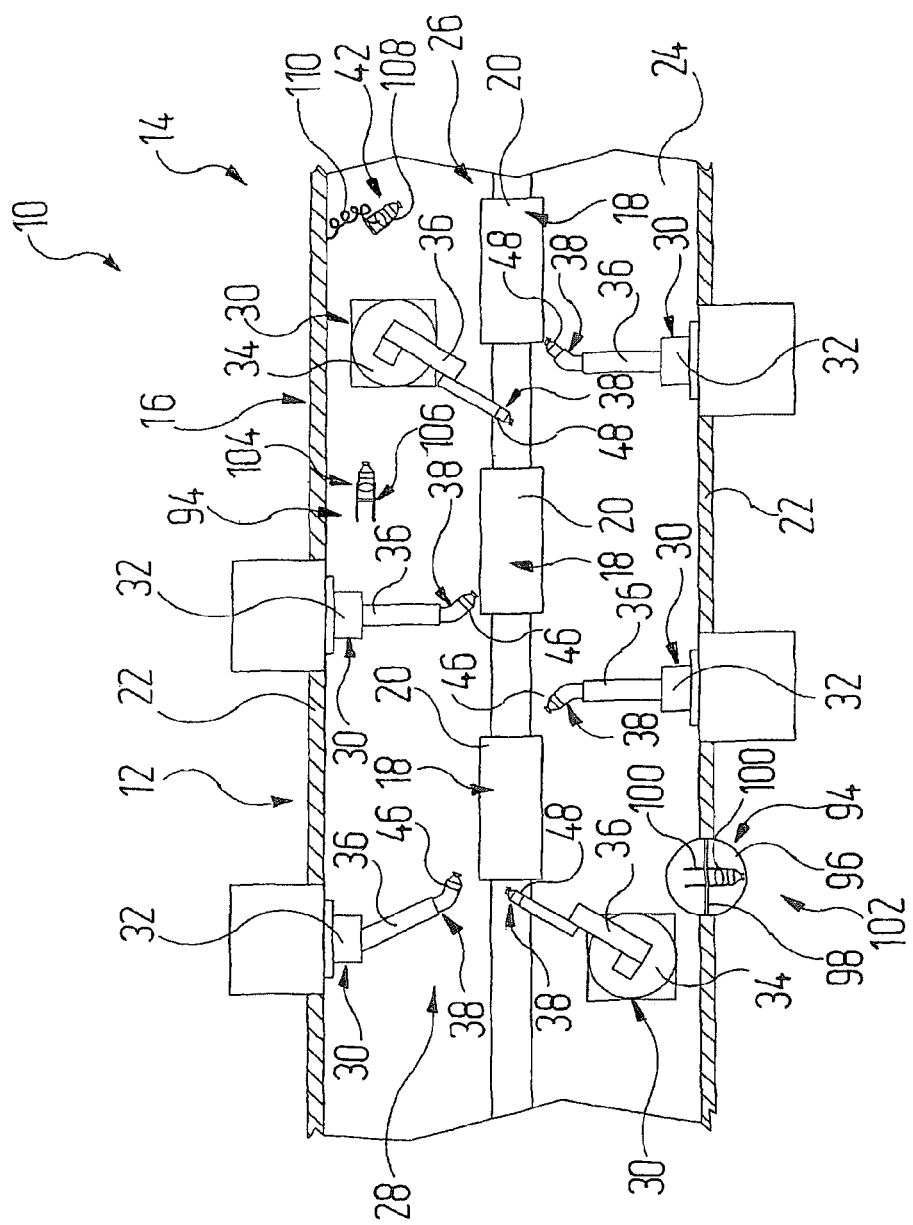
FIG. 1 a schematic view of a horizontal section of a paint booth in which paint robots are arranged which are designed so that application units carried by the paint robots can be replaced in automated manner.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is firstly made to FIG. 1. In this, 10 denotes a coating installation having a coating chamber which, in the present exemplary embodiment, is constructed as a paint installation 14 with a paint booth 16. In this, objects 18, which are illustrated schematically as rectangles, are provided with a coating medium in the form of a paint. The objects 18 are, in particular, vehicle bodies 20 or body parts.

FIG. 1 shows a horizontal section of a portion of the paint booth 16 below a booth ceiling, which is not shown in this section. The paint booth 16 comprises two parallel lateral booth walls 22 which, in the region which is no longer shown, are closed by end faces where gates or locks for the objects 18 are present in known manner. The floor of the paint booth 16 is substantially formed by a grating 24. Towards the top, the paint booth 16 is terminated in a manner known per se by an air plenum from which conditioned air can be conducted into the interior of the paint booth 16.

The objects 18 to be painted are guided through the interior of the paint booth 16 in a continuous or intermittent movement, for example from left to right in FIG. 1, with the aid of a conveyor system 26. The type of conveyor system 26 is not relevant within the present context. The objects 14 to be coated are provided with a coating in the paint booth 16 with the aid of an application system 28.

To this end, the application system 28 comprises several application robots 30 on both sides of the movement path of the objects 14 on the conveyor system 26. To exemplify that application robots can have different structures, two multiaxial jointed-arm robots 32 and one multiaxial industrial robot 34 are each shown on each side of the movement path of the objects 18.

The application robots 30 each have a movable robot arm 36, on the free end of which an application unit 38 is carried in each case. An application unit 38 of this type comprises an applicator connection unit 40 and an applicator 42 coupled thereto, which is therefore guided at the free end of the robot arm 36. This is clearly shown in FIGS. 3 and 4, which each show a hand portion 44 of the robot arm 36 on an enlarged scale. The applicator connection unit 40 is referred to in short below as a connection unit 40.

An electrostatically operating high-speed rotary atomiser 46 in FIG. 3 and a pneumatically operated spray gun 48 in FIG. 4 are shown as examples of applicators 42 of different operating modes used for the application of paints. High-speed rotary atomisers and spray guns of this type are known per se and therefore do not need describing in detail. Other types of applicator 42 are, for example, applicators for applying coatings other than paints, for example in the form of a protective coating. Applicators 42 can also be present by means of which a cleaning medium can be delivered and which are used to clean the objects 18 or even the application robots 30 themselves.

In any case, the respective applicator 42 is supplied by way of the connection unit 40 with all operating media necessary for its operation. These include not only fluid media such as paints or compressed air but also an electrical energy supply where necessary.

To this end, extending in the connection unit 40 are supply lines 50 which terminate in a connection output side 52 of the connection unit 40. The applicator 42 is coupled here to the connection unit 40, with the supply lines 50 being connected to corresponding working lines 54 which extend through the applicator 42 and are accessible by way of a connection input side 56 of the applicator 42.

In the present exemplary embodiment, the supply lines 50 extend within the connection unit 40. However, it is also possible for these supply lines 50 to be constructed as exposed lines which are optionally accessible from the outside.

The application robots 30 are now designed in such a way that application units 42 carried by the application robots 30 can be replaced in automated manner. In particular, an applicator 42 of a first operating mode, for example a high-speed rotary atomiser 46, can be replaced with an applicator 42 of a second operating mode, for example a spray gun 48, and vice versa without the connection unit 40 having to be replaced or modified for this purpose.

To this end, the connection unit 40 is constructed as an adapter unit 58 so that different applicators 42 with different working lines 54 at the connection output side 52 of one and the same connection unit 40 can be connected to the necessary supply lines 50 in the connection unit 40.

To operate the high-speed rotary atomiser 46, this has to be supplied for example with at least one paint to be applied, with compressed air, which is used as control air for forming a particular jet characteristic, and with a high voltage. Accordingly, at least one paint line 60, one compressed air line 62 and one high voltage line 64 extend in the high-speed rotary atomiser as working lines 54. The spray gun 48, on the other hand, requires at least one paint for application and compressed air which in this case serves as atomiser air. The spray gun 48 therefore has at least one paint line 66 and one compressed air line 68 as working lines 54. Only highly schematic portions of all lines 60, 62, 64, 66 and 68 are shown in FIGS. 3 and 4.

A plurality of supply lines 50, of which a plurality form a supply group 50*a* and a supply group 50*b* in each case, extend through the connection unit 40 for the high-speed rotary atomiser 46. Each supply group 50*a*, 50*b* is complementary to a particular operating mode of an applicator 42. For example, in the present case, the first supply group 50*a* is associated with the high-speed rotary atomiser 46 and the second supply group 50*b* is associated with the spray gun 48.

A paint line 60', a compressed air line 62' and a high voltage line 64' belong to the supply lines 50 of the first supply group 50*a* whilst the supply lines 50 of the second supply group 50*b* comprise a paint line 66' and a compressed air line 68'. With the addition of a prime, the reference numerals correspond to the reference numerals of the paint lines 60 and 66, the compressed air lines 62 and 68 and the high voltage line 64 of the high-speed rotary atomiser 46 and the spray gun 48. This shows which line in the connection unit 40 has to be connected to which line of the high-speed rotary atomiser 46 or spray gun 48 during operation.

At a point which is remote from the connection output side 52, the supply lines 50 of the supply groups 50*a*, 50*b* in the connection unit 40 are fed by a respective paint source, a compressed air source and a high voltage source, as is known per se and is therefore not shown specifically.

As has been addressed above, the connection unit 40 is part of an adapter unit 58 so that different applicators 42 with different operating modes can be coupled to one and the same connection unit 40 and can be operated on one and the same application robot 30 without extensive modification measures.

To this end, the adapter unit 58 comprises a coupling device 70 with the aid of which an applicator 42 can be releasably fastened to the connection unit 40 in automated manner. The adapter unit 58 moreover comprises a connecting device 72 by means of which supply lines 50 of the connection unit 40 can be blocked or functionally connected to an applicator 42 as required. By means of the connecting device 72, those supply lines 50 in the connection unit 40 can be connected to the working lines 52 present in each case in a particular applicator 42 and supply lines 50 which are not required can be blocked.

In the present exemplary embodiment, the explained functionalities of the coupling device 70 and the connecting device 72 are unified in a single adapter member 74. This adapter member 74 is constructed concretely as a rotary plate 76 here, which is arranged at the free end of the connection unit 40 and defines the connection output side 52 of the connection unit 40 and the robot arm 36.

Figure 5:
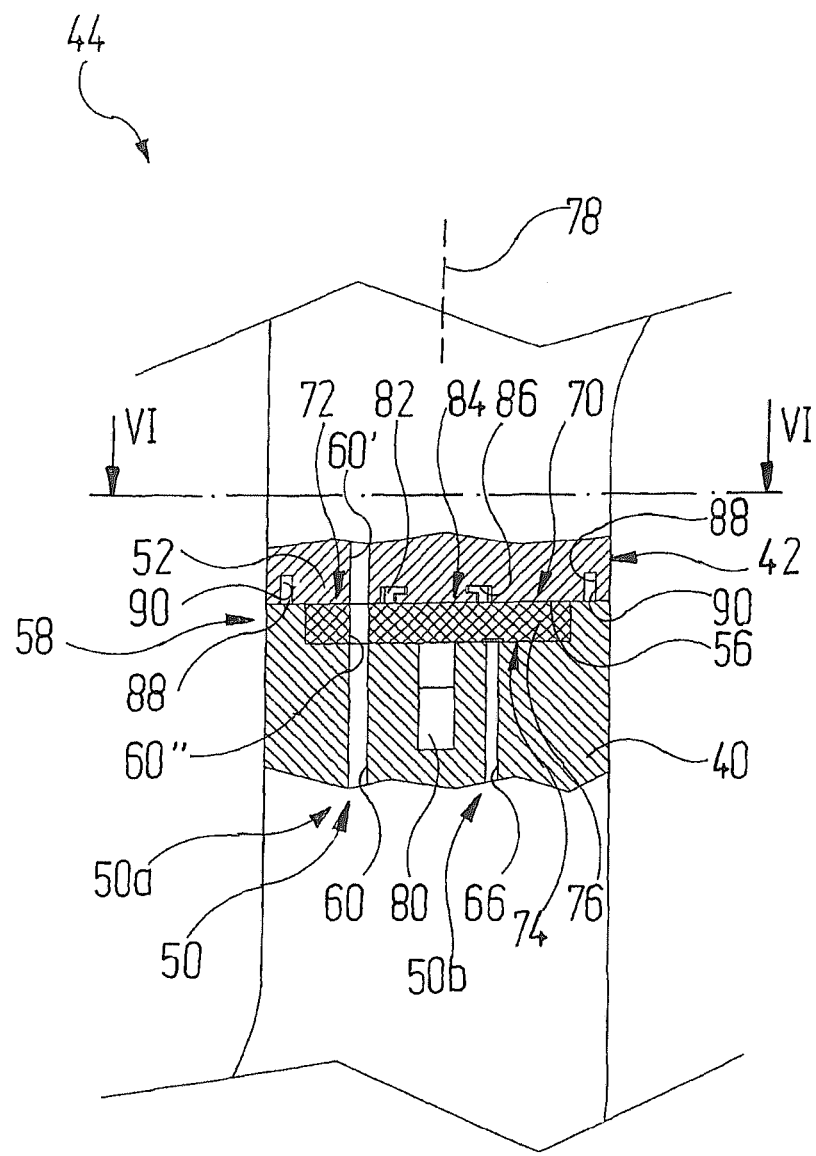
FIG. 5 a partial section of a hand portion of the paint robot, which shows a connection output side of an applicator connection unit, which is constructed as an adapter unit, and a connection input side of an application unit.

The rotary plate 76 is rotatably mounted and can be rotated about an axis of rotation 78, which is only indicated in FIG. 5, by means of a motor 80 which is accommodated in the connection body 40. In the present case, the axis of rotation 78 extends coaxially to the longitudinal axis of the connection unit 40.

In a modification which is not shown specifically, the movement of the coupling device 70 and/or the connecting device 72 can also be produced by separate drives or by movement sequences of the robot arm 36.

The coupling device 70 is of a complementary construction to fastening means on the applicators 42 so that the different applicators 46 and 48 can be fastened to the connection unit 40. In the present exemplary embodiment, the coupling device 70 of the connection unit 40 is constructed as a plug-in/turning part 82 of a bayonet closure 84, whereof the complementary holding part 86 is present on the respective applicators 42.

The plug-in/turning part 82 is present on the outer surface, facing the applicator 42, of the rotary plate 76. The coupling device 70 moreover comprises two fixing pins 88 which project from the connection unit 40 radially adjacent to the rotary plate 76 and can dip into blind holes 90 complementing them on the connection input side 56 of the applicators 42.

In order to couple the robot arm 36 to the applicator 42, the connection output side 52 of the robot arm 36 is moved coaxially towards the connection input side 56 of the applicator 42 and aligned so that the fixing pins 88 of the connection unit dip into the blind holes 90 and the plug-in/turning part 82 of the bayonet closure dips into the holding part 86 thereof on the applicator 42. The rotary plate 76 is now rotated by motor 80 whilst the position of the applicator 42 remains fixed with respect to the robot arm 36 as a result of the fixing pins 88. During the rotation of the rotary plate 76, the bayonet closure 84 is locked and the applicator 42 is locked on the robot arm 36.

At the same time, during the rotation of the rotary plate 76, the respective supply groups 50a, 50b in the connection unit 40 are connected to the respective working lines 54 of the selected applicator 42.

To this end, the rotary plate 76 comprises a plurality of connecting lines 92 which, in the present exemplary embodiment, are arranged in two connecting groups 92a, 92b. The first connecting group 92a comprises a paint line 60", a compressed air line 62" and a high voltage line 64". The second connecting group 92b comprises a paint line 66" and a compressed air line 68".

With the addition of one or two primes, the reference numerals correspond to the reference numerals of the paint lines 60, 60' and 66, 66', the compressed air lines 62, 62' and 68, 68' and the high voltage line 64, 64' of the high-speed rotary atomiser 46, the spray gun 48 and the connection unit 40. This again shows which line in the rotary plate 76 should be connected to which line of the connection unit 40 or the high-speed rotary atomiser 46 or the spray gun 48 during operation.

In terms of their construction and arrangement, the lines 60", 62" and 64" of the first connecting group 92a of the rotary plate 76 are therefore complementary to the paint lines 60, 60', the compressed air lines 62, 62' and the high voltage lines 64, 64' of the high-speed rotary atomiser 46 and the connection unit 40. In terms of their construction and arrangement, the lines 66" and 68" of the second connecting group 92b of the rotary plate 76 are accordingly complementary to the paint lines 66, 64' and the compressed air lines 68, 68' of the spray gun and the connection unit 40.

However, the connecting groups 92a, 92b here are positioned so that, in a first connecting position, the connecting lines 92 of the first connecting group 92a are connected to the supply lines 50 of the first supply group 50a in the connection unit 40 whilst the supply lines 50 of the second supply group 50b in the connection unit 40 are tightly closed by the rotary plate 76.

Figure 6:
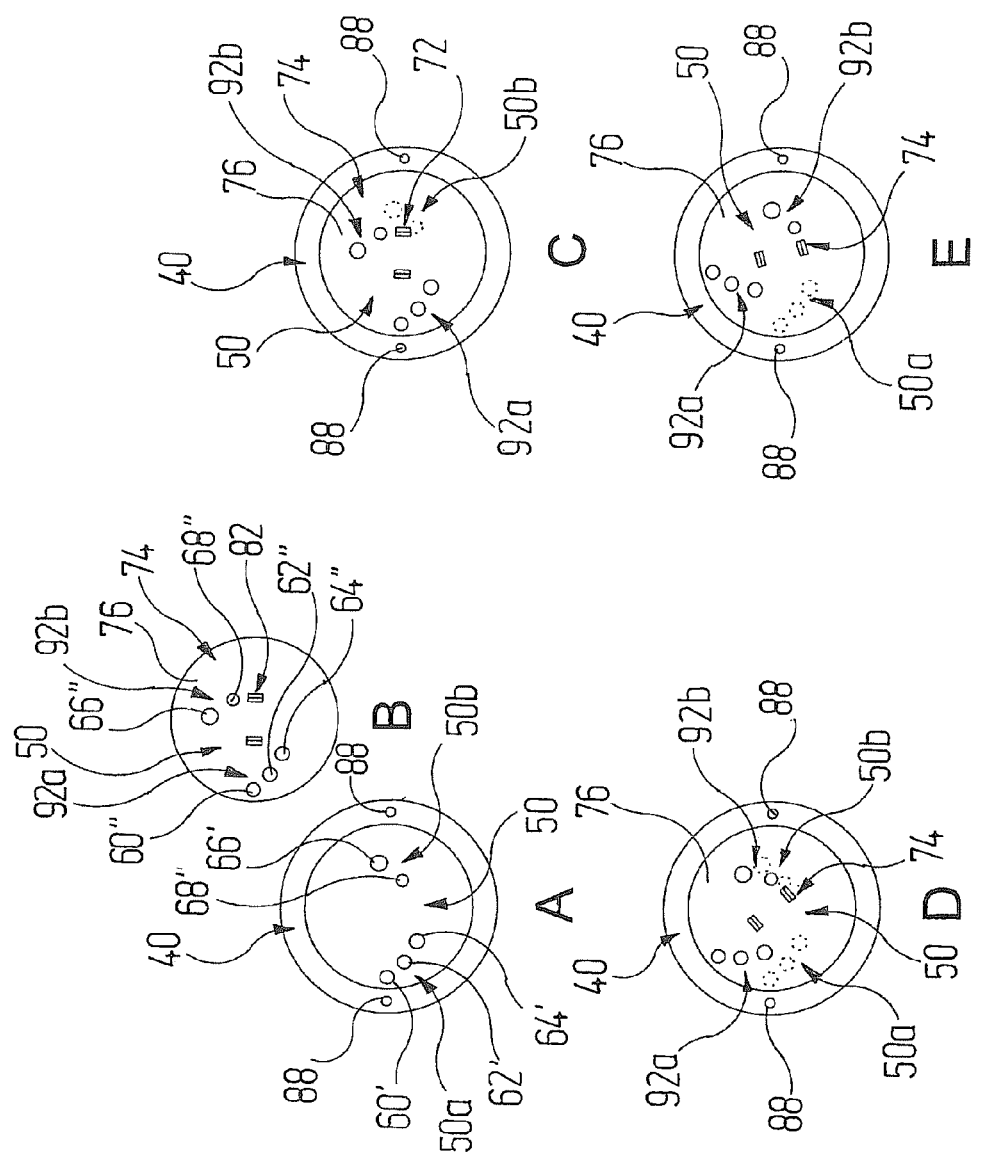
FIGS. 6A and 6B a plan view of the applicator connection unit of the paint robot and an adapter member of the adapter unit.
FIGS. 6C, 6D, 6E plan views of the connection output side of the applicator connection unit, wherein the adapter member assumes different connecting positions.

This is shown with reference to FIGS. 6A to 6E. FIGS. 6A and 6B show the connection unit 40 and the rotary plate 76 again in a separate plan view. The supply groups 50a and 50b and the fixing pins 88 of the connection unit 40 as well as the connecting groups 92a, 92b and the plug-in/turning part 82 of the rotary plate 76 are shown. In FIGS. 6C to 6E, the individual lines are no longer provided with separate reference numerals for the sake of clarity, but are merely denoted as supply groups 50a, 50b or connecting groups 92a, 92b.

The first connecting position explained above is shown in FIG. 6C, in which the closed lines of the second supply group 50b for the spray gun 48 are shown in phantom view.

In a second connecting position, which is shown in FIG. 6E, the lines of the second connecting group 92b of the rotary plate 76 are connected to the lines of the second supply group 50b in the connection unit 40 and the first supply group 50a thereof is closed by the rotary plate 76. Disconnection from the lines which are not required is ensured by corresponding sealants, lubricants or insulants which are not shown specifically here.

In a changeover position of the rotary plate 76, which is shown in FIG. 6D, both supply groups 50a, 50b of the connection unit 40 are closed. The supply groups 50a, 50b of the connection unit 40 are again shown in phantom view. In this changeover position of the rotary plate 76, the plug-in/turning part 82 can in each case dip into the respective holding part 86 on the applicators 42 and be moved out of this when the robot arm 36 and the applicator 42 are positioned so that the fixing pins 88 on the connection unit 40 are aligned coaxially to the blind holes 90 of the applicator, as required for changing the applicators 42.

In the present exemplary embodiment, the different compressed air lines 62', and 68' of the connection unit 40 are associated with the high-speed rotary atomiser 46 and the spray gun 48. If different applicators 42 comprise functionally similar working lines 54, these can also be supplied by way of one and the same supply line 50 of the connection unit 40. The connecting groups 92a, 92b are then arranged accordingly.

In a modification which is likewise not shown specifically, it is also possible for more supply groups than the two supply groups 50a, 50b to be present, so that the connection unit 40 can serve as an adapter unit 50 for a greater number of different applicators 42 than the applicators 42 of a first and second operating mode. In this case, the adapter member 74 in the form of the rotary plate 76 can assume more than two connecting positions, in which case all supply lines 50 are again closed in the changeover position.

In a further modification, which is not shown, the connecting device 72 can, for example, also be formed by valves which are associated with the respective supply lines 50 in the connection unit 40. By way of a control means provided for this, it is then possible for the supply lines 50 to be opened or closed individually or as groups as required.

Figure 2:
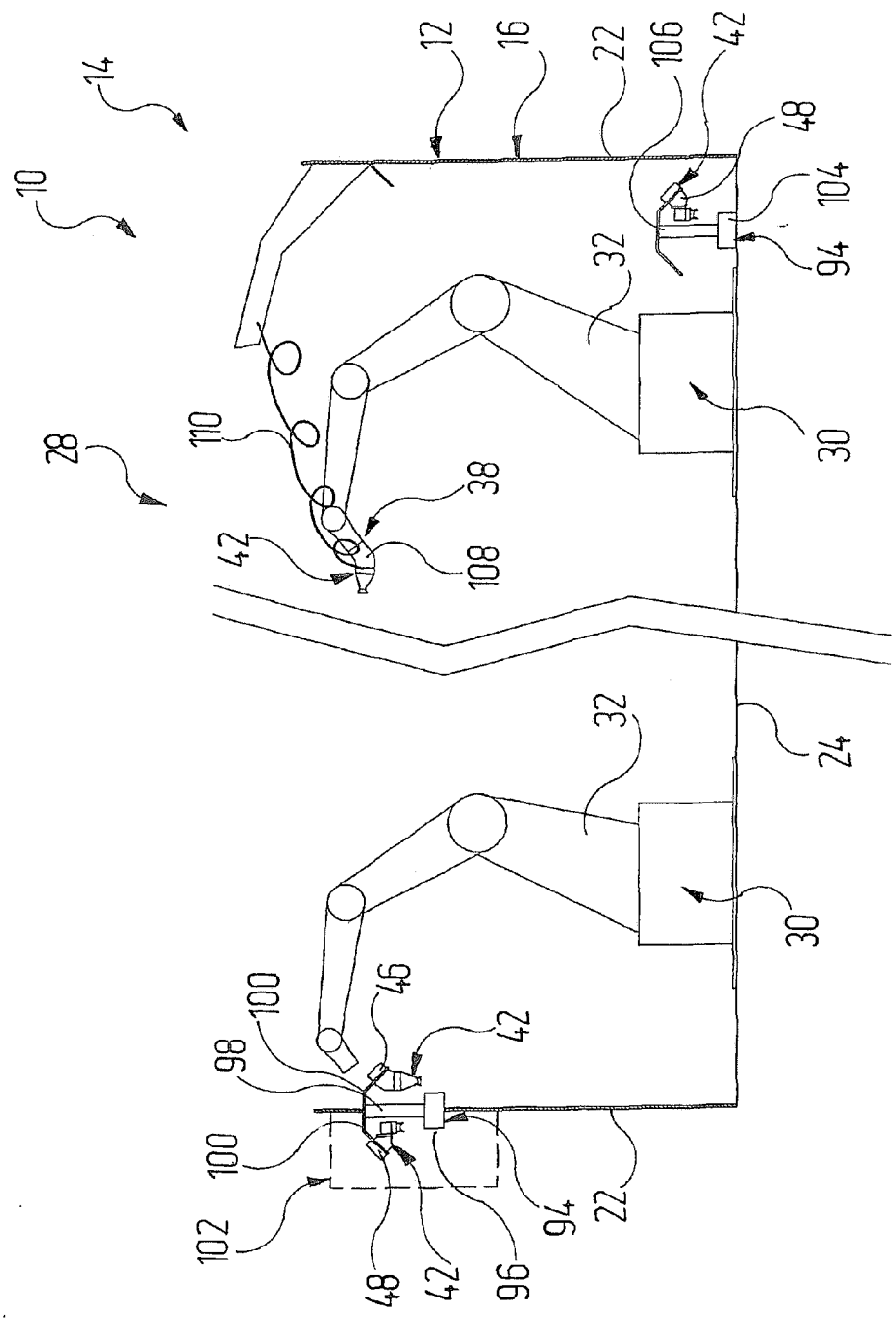
FIG. 2 a schematic view of a vertical section of the paint booth of FIG. 1.

In the paint booth 16 shown in FIGS. 1 and 2, changeover stations 94 are now present in which applicators 42 of different operating modes can be held available, as again shown in the form of high-speed rotary atomisers 46 and spray guns 48. In FIG. 1, two changeover stations 94 are shown by way of example; it is essentially possible for a changeover station 94 to be provided in the movement region and operating window of each application robot 30.

A first changeover station 94 is constructed as a changeover lock in the form of a rotary station 96 and integrated in one of the cabin walls 22 of the paint booth 16. The rotary station 96 comprises, as a lock element, a rotary wall 98 on the opposite sides of which a respective applicator holder 100 is arranged, which can each receive an applicator 42. In the rotary station 96, one of the applicator holders 100 projects into the interior of the paint booth 16 whilst the other applicator holder 100 is located outside the paint booth 16 in an operating zone 102.

The applicator holder 100 can be equipped here with a particular applicator 42, for example with a high-speed rotary atomiser 46 or a spray gun 48, which, after a rotation of the rotary wall 98, can be made available in the interior of the paint booth 16 without an operator having to enter inside the booth.

A second changeover station 94 is arranged as a stationary changeover station 104 in the interior of the paint booth 16 and comprises an applicator holder 106 which, in the present case, provides two receiving places for applicators 42. In a modification, the applicator holder 106 can also receive a plurality of applicators 42 and be constructed for example in the manner of a carousel.

The adapter unit 58 explained above can also serve purely as a changeover unit for applicators 42 for which there is no supply line in the connection unit 40 or in the robot arm 36. In this case, the connection unit 40 simply serves as a support and guide unit for the applicator 42.

In terms of the bayonet closure 84, an applicator 42 of this type is then complementary to the connection unit 40. In particular, in this case the positions of the supply groups 50a, 50b in the connection unit 40 and the connecting groups 92a, 92b in the rotary plate 76 have to be adapted so that the rotary plate 76 can be rotated into a stop position in which, on the one hand, an applicator 42 is fixed to the robot arm 36 but the supply groups 50a, 50b in the connection unit 40 are not tightly closed.

As an example of this, FIGS. 1 and 2 show a cleaning applicator 108 which is supplied with the necessary operating media by way of a spiral line 110. For example, carbon dioxide $CO_2$ as carbon dioxide snow can be used as a cleaning medium, for which both $CO_2$ and compressed air are supplied to the cleaning applicator 108. To this end, the spiral line 110 is bifilar and comprises a $CO_2$ strand and a compressed air strand. It is also possible to consider using a brush or the like as the cleaning applicator, which can be used to apply a cleaning fluid and distribute it on an object to be cleaned.

A possible cleaning procedure may be one in which a first application robot 30 removes adherent paint overspray from a second application robot 30. However, the objects 14 can also be cleaned by the cleaning applicator 108. As a cleaning medium, a solvent or cleaning agent can also be sprayed with the cleaning applicator 108.

As an example for changing an applicator, it is assumed that a high-speed rotary atomiser 46 on the robot arm 36 is to be replaced with a spray gun 48 in automated manner. To this end, the robot arm 36 firstly guides the high-speed rotary atomiser 46 to a free space in a changeover station 94. The rotary plate 76 is then rotated by a motor into its changeover position, as a result of which all supply lines 50 in the connection unit 40 are closed or existing electrical contacts are disconnected and the holding part 86 of the bayonet closure 84 on the high-speed rotary atomiser 46 releases the plug-in/turning part 82 on the connection unit 40. The robot arm 36 then draws the connection unit 40 away from the high-speed rotary atomiser 46 in a movement which is axially parallel to the fixing pins 88. The robot arm 36 guides the connection unit 40 to a spray gun 48 in a changeover station 94 and moves these towards one another until the parts 82 and 86 of the bayonet closure 84 engage in one another. The components are again guided by the fixing pins on the connection unit 40 and the blind holes 90 in the spray gun 48. The rotary plate 76 is rotated into its second connecting position by a motor, whereby the bayonet closure 84 is locked and the supply lines 50 for the spray gun 48 are connected to the working lines 54 thereof. The spray gun 48 is now ready for use.

It is also possible for the applicators 42 not to movably guided by a multiaxial applicator robot 30 and to instead be held stationary and without any degree of freedom on a corresponding carrying structure, which also supports the connection unit 40. In this case, an object to be coated is moved in front of the applicator 42 by means of a multiaxial industrial robot.

It is then possible to change an applicator 42 which is held in this manner by means of a movable changeover unit which can in turn be constructed as a multiaxial industrial robot which is equipped with a gripping device which can grip the applicators 42 and remove them from, or transfer them to, the connection unit 40.

Therefore, in general terms, a relative movement between the applicator 42 to be replaced and the changeover device takes place in both changeover variants.

The connection unit 40 can moreover comprise a sensor device which can detect which type of applicator 42 has been received. This sensor device can then cooperate with an application control means so that, depending on the type of applicator 42 used, it is possible to prevent supply lines 50 which are not required from being acted upon by an operating medium.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An applicator connection unit for an application robot for coating objects comprising:
   supply lines for at least one applicator and to which the at least one applicator can be fastened in such a way that working lines of the at least one applicator are connected to the supply lines of the applicator connection unit
   wherein
   the applicator connection unit is constructed as an adapter unit in such a way that at least one applicator of a first operating mode and at least one applicator of a second operating mode can be releasably and replaceably fastened to the applicator connection unit
   further wherein
   a) the supply lines comprise a first supply group having supply lines for the at least applicator of the first operating mode and at least one second supply group having supply lines for the at least one applicator of the second operating mode; and
   b) the applicator connection unit comprises a connecting device by means of which supply lines of the applicator connection unit can be optionally blocked or functionally connected to working lines of at least one applicator, and
   further wherein
   the connecting device comprises an adapter member with connecting lines which can assume at least two connecting positions such that, in a first connecting position, connecting lines of a first connecting group are connected to the supply lines of the first supply group and, in a second connecting position, connecting lines of a second connecting group are connected to the supply lines of the second connecting group and moreover, in a changeover position, closing all supply groups of the applicator connection unit.

2. The applicator connection unit according to claim 1, wherein the adapter member is constructed as a rotatably mounted rotary plate which defines a connection output side of the applicator connection unit.

3. The applicator connection unit according to claim 1, wherein a coupling device is present, which is of a complementary construction to fasteners on the at least one applicator.

4. The applicator connection unit according to claim 3, wherein the coupling device is constructed as a plug-in/turning part of a bayonet closure.

5. An application robot for coating objects comprising: a robot arm and an applicator connection unit for an applicator, which applicator connection unit is carried by the robot arm,
wherein
the applicator connection unit is constructed according to claim 1.

6. An installation for coating objects comprising:
a coating chamber in which at least one application robot is arranged, which comprises a robot arm and an applicator connection unit for an applicator, which applicator connection unit is carried by the robot arm,
wherein
the applicator connection unit is constructed according to claim 1.

7. The installation according to claim 6, wherein, arranged in the coating chamber, there is at least one changeover station by means of which at least one applicator of a first operating mode and at least one applicator of a second operating mode are held available.

8. The installation according to claim 7, wherein the changeover station is constructed as a changeover lock and comprises a lock element which separates the coating chamber from an operating zone arranged outside the coating chamber.

9. An applicator connection unit for an application robot for coating objects comprising:
supply lines for an applicator to which the applicator can be fastened in such a way that working lines of the applicator are connected to the supply lines of the applicator connection unit
wherein
the applicator connection unit is constructed as an adapter unit in such a way that at least one applicator of a first operating mode and at least one applicator of a second operating mode can be releasably and replaceably fastened to the applicator connection unit
further wherein
a) the supply lines comprise a first supply group having supply lines for the applicator of the first operating mode and at least one second supply group having supply lines for the applicator of the second operating mode; and
b) the applicator connection unit comprises a connecting device by means of which supply lines of the applicator connection unit can be optionally blocked or functionally connected to working lines of an applicator, and
further wherein
the connecting device comprises an adapter member with connecting lines which can assume at least two connecting positions such that, in a first connecting position, connecting lines of a first connecting group are connected to the supply lines of the first supply group and, in a second connecting position, connecting lines of a second connecting group are connected to the supply lines of the second connecting group and moreover, in a changeover position, closing all supply groups of the applicator connection unit
and a coupling device is present, which is of a complementary construction to fasteners on the applicators.

10. The applicator connection unit according to claim 9, wherein the adapter member comprises the coupling device.

11. The applicator connection unit according to claim 9, wherein the coupling device is constructed as a plug-in/turning part of a bayonet closure.

12. The applicator connection unit according to claim 11, wherein the adapter member comprises the coupling device.

* * * * *